United States Patent [19]

Limare et al.

[11] 4,395,291
[45] Jul. 26, 1983

[54] PROCESS FOR MAKING NON-DUSTING HIGH LEAD OXIDE-LOW SILICA ADDITIVE

[75] Inventors: Armand Limare, Bouillet; Bernard Razumowski, Plaisir; Claude Sindezingue, Senlis, all of France

[73] Assignee: Societe Anonyme Societe Miniere et Metallurgique de Penarroya, Paris, France

[21] Appl. No.: 359,781

[22] Filed: Mar. 19, 1982

Related U.S. Application Data

[63] Continuation of Ser. No. 128,259, Mar. 7, 1980, abandoned.

[30] Foreign Application Priority Data

Mar. 9, 1979 [FR] France .................. 79 06049

[51] Int. Cl.$^3$ .................................................. C09C 1/14
[52] U.S. Cl. ........................................ 106/297; 106/74; 501/27; 501/29; 501/74
[58] Field of Search .......................... 501/27, 29, 22, 74; 423/619; 106/297, 74; 264/117

[56] References Cited

U.S. PATENT DOCUMENTS

| | | | |
|---|---|---|---|
| 3,623,838 | 11/1971 | Kunz et al. | 423/619 |
| 3,956,004 | 5/1976 | Sugahara et al. | 106/297 |

FOREIGN PATENT DOCUMENTS

| | | | |
|---|---|---|---|
| 557019 | 5/1957 | Belgium . | |
| 1160577 | 7/1958 | France . | |
| 2300743 | of 1976 | France . | |
| 841884 | 7/1960 | United Kingdom | 423/619 |

OTHER PUBLICATIONS

Glastechnische Berichte, vol. 51, No. 12, Dec. 1978, p. 309 Table 1 (pp. 307–316).

*Primary Examiner*—Helen M. McCarthy
*Attorney, Agent, or Firm*—Fleit, Jacobson & Cohn

[57] ABSTRACT

A lead additive containing a lead oxide and an alkaline silicate which is resistant to dusting, abrasion and segregation. The weight ratio of lead to alkaline silicate, calculated as PbO and SiO$_2$, respectively, is greater than about 95:5; the moisture content is less than or equal to about 2%; and the density is less than about 5 g/cm$^3$.

The process for producing these additives involve forming a paste of the lead oxide and alkaline silicate, conditioning the paste to form granules and heat treating the granules.

9 Claims, No Drawings

PROCESS FOR MAKING NON-DUSTING HIGH LEAD OXIDE-LOW SILICA ADDITIVE

This is a continuation of application Ser. No. 128,259 filed Mar. 7, 1980, now abandoned.

BACKGROUND OF THE INVENTION

1. Field of the Invention

The present invention relates to a novel lead additive capable of being used inter alia in the glass industry, e.g., in crystal-works, and the ceramic industry, as well as to the process for its production.

2. Description of the Prior Art

The glass and ceramic industries currently use lead oxides, minium and/or litharge, which are powdery products the particles of which generally have a diameter of less than 40 microns. Because of their scattering and dusting, in the course of handling, e.g., as batches are prepared and placed in the furnace, use of such products involves significant risks of atmospheric pollution. This may cause lead-poisoning problems in the users of these powdery lead oxides.

It has often been proposed to agglomerate these powdery products through use of a bonding agent so as to obtain granules which would be easier to handle. As bonding agents, water and silicates as are employed in the composition of glases and ceramics have been used, among others.

Thus French patent application No. 2,300,743 describes a process for producing minium granules of a particle size of between 0.5 and 5 mm. These are prepared by introducing minium powder into a granulator consisting of a rotating tank which is open at the top and inclined with respect to the vertical axis, and pulverizing an aqueous solution of potassium silicate in this tank. The proportion of potassium silicate in the granules may vary between 2.5 and 5% by weight, preferably between 3 and 4.5%.

Other granules are prepared using water as the binder, but these produce dust during handling. In addition, their abrasion resistance is low.

None of these agglomerates are entirely satisfactory, either because their granulometry causes segregation effects upon mixing with other constituents of the batch and upon fusion, or because too much dust is produced during handling.

One object of the present invention is therefore to provide a new lead additive, particularly for the glass and ceramics industries, presented in the form of granules having greater abrasion resistance than presently known products and a granulometry similar to that of other components of the batch in which the new additive is used.

An additional object of the invention is a new lead additive which does not involve the production of dusts during handling, which dusts are a source of pollution and often of lead poisoning.

One purpose of the present invention is to provide a process enabling production of this novel lead additive in the form of granules which do not produce dust during handling, the granules having good abrasion resistance and a granulometric distribution adapted to that of the other components of the batches in which it is used.

An additional purpose of the invention is to provide a process enabling production of granules of irregular shape.

Another purpose of the invention is to provide a process eventually enabling direct production of this new lead additive in the form of granules of desired sizes, i.e., without the need for subsequent grinding.

An additional purpose of the invention is to provide a process enabling production of granules of either primary lead oxides, litharge, minium, or their mixtures.

Further objects, purposes and advantages of the present invention will become apparent upon reading the undergoing specification and claims.

SUMMARY OF THE INVENTION

The lead additive according to the present invention contains a lead oxide and a water-soluble alkaline silicate in which the weight ratio of lead, calculated as PbO, to alkaline silicate, calculated as $SiO_2$, is greater than about 95:5; in which the moisture content is less than or equal to about 2%; and which has a density of less than or equal to about 5 g/cm$^3$. The lead oxide is preferably selected from the primary lead oxides, litharge, minium and their mixtures, and the alkaline silicate is preferably sodium silicate, potassium silicate or a mixture thereof.

In the process in accordance with the present invention, a lead oxide is mixed with all or a part of a predetermined quantity of a water-soluble alkaline silicate to obtain a malleable paste. The paste is then conditioned or shaped to provide granules of an appropriate size. Finally, the granules are subjected to a heat treatment.

DESCRIPTION OF THE PREFERRED EMBODIMENTS

The novel lead additive according to the present invention contains a lead oxide and a water-soluble alkaline silicate in which the weight ratio of the quantity of lead, calculated as PbO, to the quantity of alkaline silicate, calculated as $SiO_2$, is greater than approximately 95:5, preferably between about 18:1 and 32:1; and in which the moisture content is less than or equal to about 2%; and which has a density of at most equal to about 5 g/cm$^3$.

Advantageously, the weight ratio of the quantity of lead, calculated as PbO, to the quantity of silicate, calculated as the sum of silica and alkaline oxides contained in the silicate, is between 14:1 and 24:1, and is most preferably between 14:1 and 18:1.

Preferably, the lead oxide is selected from the group consisting of the primary lead oxides, litharge, minium, and their mixtures.

Advantageously, the alkaline silicate is selected from the group consisting of sodium silicate, postassium silicate, or a mixture thereof, and is optionally supplemented with soda and/or potash.

Preferably, the weight ratio of the quantity of silica to that of the alkaline oxide(s) contained in the silicate is between 1:1 and 4:1 and advantageously between 3:1 and 4:1.

The process of producing this lead additive of the present invention consists of the following steps, during which:

(a) a lead oxide is mixed with all or part of a given quantity of water-soluble alkaline silicate so as to obtain a malleable paste;

(b) the product obtained in step (a) is conditioned, or shaped, so as to obtain granules of suitable size; and (c) the product obtained in step (b) is subjected to heat treatment.

The malleable paste obtained in step (a) may also be heat treated before shaping step (b).

Advantageously, heat treatment step (c) comprises a first phase conducted at a temperature of between about 50° and 200° C. for a period of from several minutes to about one hour, and a second phase conducted at a temperature of between about 80° and 700° C. for a period varying from several minutes to about one hour. Preferably, the temperature of the second phase is between about 300° and 450° C. when the oxide is minium, and between about 400° and 700° C. when the oxide used is litharge. The two phases may be carried out in the same enclosure.

Conditioning step (b) may be performed in such a way as to directly obtain granules having the requisite size, without the need for subsequent grinding of the product.

Advantageously, steps (b) and (c) may be performed simultaneously. In this case, during step (a) the lead oxide is mixed with at most two thirds, preferably less than half, of the total quantity of alkaline silicate, and the remaining quantity is added between the first and second phases of heat treatment step (c). The first phase is carried out at a temperature of between about 50° and 70° C. for a period of from several minutes to about an hour and the second phase at a temperature of between about 80° and 150° C., preferably between about 100° and 130° C. for several minutes to an hour.

According to one embodiment of the present invention, minium ($Pb_3O_4$) is chosen as the lead oxide, and a soluble alkaline silicate is provided in an aqueous solution, the silicate concentration of which is between about 30 and 90% silicate by weight. If use is made of an alkaline silicate having a molecular ratio, $R_m$ ($SiO_2$/alkaline oxide), equal to one, mixing step (a) should be conducted at a temperature of from about 50° to 100° C., preferably from about 60° to 70° C. On the other hand, if the molecular ratio, $R_m$, is greater than or equal to 2, the mixture should be made cold, i.e., at ambient temperature.

According to a second embodiment of the invention, litharge is selected as the lead oxide and is mixed with the soluble alkaline silicate in the form of an atomized powder, i.e., one obtained by atomization of a solution of the silicate. These two constituents may be mixed cold regardless of the molecular ratio, $R_m$, of the alkaline silicate, with the necessary quantity of water added to obtain a paste which remains malleable.

According to a third embodiment, the entire quantity of the lead oxide is mixed with at most two thirds, preferably less than half, of the total quantity of water-soluble alkaline silicate. Then the malleable paste obtained and conditioned into granules is subjected to a first drying phase conducted at a temperature between about 50° and 70° C. for several minutes to about an hour. The dried product is then mixed with the remaining soluble alkaline silicate and the product obtained is subjected to a second drying phase conducted at a temperature between about 80° and 150° C., preferably between about 100° and 130° C., for several minutes to about an hour. Granules in accordance with the present invention are thus produced.

The following description is not intended to limit the scope of the present invention. It is included to enable those of ordinary skill in the art to better understand how the present invention may be put into practice.

In the course of step (a), a lead oxide is mixed with a soluble alkaline silicate which is, preferably, a silicate of sodium or potassium or mixture thereof. The weight ratio of silica to alkaline oxide (e.g., $SiO_2/Na_2O$) is between about 1:1 and 4:1, preferably between 3:1 and 4:1, and most preferably between 3:1 and 3.4:1.

Either a primary oxide, litharge, minium, or their mixtures may be used as the lead oxide.

In the case where minium is chosen, the soluble alkaline silicate is preferably used in an aqueous solution having a silicate concentration of between about 30 and 90% by weight. If the molecular ratio, $R_m$, of the alkaline silicate is equal to one, which corresponds to metasilicate, the step (a) mixture should be made at a temperature of between about 50° and 100° C., preferably between 60° and 70° C., to avoid accelerated crystallization of the metasilicate hydrates. If the mixture were made cold, the past obtained would harden very quickly and would not remain malleable for several hours, let alone several days.

By contrast, if the molecular ratio, $R_m$, of the alkaline silicate used is greater than or equal to 2, the mixture may be made cold, i.e., at ambient temperature, in order to obtain sufficient plasticity and a lasting homogeneity.

In the case where litharge is chosen as the lead oxide, it is preferably mixed cold with the alkaline silicate in the form of an atomized powder (obtained by atomization of a silicate solution), with the necessary amount of water being added to obtain a paste capable of remaining malleable for some time. Generally, this amount is approximately 12% of the amount of litharge.

It is equally possible to obtain litharge granules by using the previous described process for minium.

The quantity of alkaline silicate, calculated as silica $SiO_2$, added to the lead oxide, calculated as PbO, is such that it is from about 2 to 6% by weight of the product resulting from step (c).

The paste resulting from step (a) may be emptied from the mixing apparatus either periodically or continuously and conditioned in the form of threads, ribbons, bars, logs, balls, granules, powder obtained by grinding the above products, or in any other form that permits continuous feeding to heat treatment step (c).

This paste, conditioned or not, is subjected to a heat treatment comprising two successive phases.

The first phase, which is a drying, is conducted at a temperature of between about 50° and 200° C., preferably between about 105° and 180°, for a period varying from about 15 minutes to one hour. During this phase, dehydration is relatively slow.

The second phase is conducted at a temperature of between about 80° and 700° C. for a period varying from about 15 minutes to one hour. The temperature is preferably between about 300° and 450° C. if the lead oxide is minimum, and between about 400° and 700° C. if it is litharge.

The second phase of heat treatment, which in this case is a fritting phase, permits continuation or completion of the dehydration of the conditioned paste and the production of an abrasion resistant product.

The drying and fritting may be performed in the same enclosure, the temperature profile of which is determined by the desired temperature conditions.

Following heat treatment step (c), a product is formed which does not stain the fingers and which resists light abrasion, which it may typically undergo, e.g., during transportation and handling.

Depending on the desired granulometry of the final product, the product issuing from step (c) may be conditioned in classic instruments such as grinders and choppers and treated in a known fashion (sifting, elutriation) so as to retain only the desired granulometric fraction. It is clear that this conditioning step should involve only minimal production of granules of having the non-desired granulometry and which need to be recycled. Furthermore, the anti-dust quality of the present product must not be altered due to fine particles formed during grinding which are difficult to eliminate by sifting. So, it is preferred to avoid this final grinding step by selecting instrumentation which, used according to the present invention, will directly yield a final product.

To obtain the novel lead additive of the present invention by simultaneously performing steps (b) and (c), the entire quantity of lead oxide selected from the groups consisting of the primary lead oxides, minium, litharge or their mixtures is mixed with at most half of the total quantity of soluble alkaline silicate, preferably with from about 30 to 50%. The paste thus obtained is then subjected to conditioning, which may be performed during the mixing step, in order to obtain first granules, which are subjected to a first drying phase, which is conducted at a temperature between about 50° and 70° C. for several minutes to about an hour. These first granules are then mixed with the remaining quantity of alkaline silicate and the mixture is brought to a temperature of between about 80° and 700° C., preferably between about 50° and 150° C., when no particular reaction between the binder and the oxide(s) is sought, for a period of several minutes to an hour. The granules thus obtained have a particle size of less than 0.5 mm.

These granules are advantageously obtained by using, for the mixing and conditioning steps, instruments having high speeds of rotation, i.e., between about 1,000 and 15,000 rpm.

The novel lead additive according to the present invention possesses physico-chemical characteristics which are very favorable to its use in the glass (particularly crystal) and ceramics industries. The weight ratio of the quantity of lead, calculated as PbO, to the quantity of alkaline silicate, calculated as $SiO_2$, is greater than approximately 95:5. In order to obtain, by the process described above, a new additive according to the present invention having particular properties, it is advantageous that the weight ratio of the quantity of lead, calculated as PbO, to the quantity of binder, expressed as $SiO_2$ contained in the binder, be between about 18:1 and 32:1, and preferably between about 18:1 and 23:1. In addition, the weight ratio of the quantity of lead, calculated as PbO, to the quantity of binder, calculated as the sum of silica and alkaline oxides contained in the silicate, should be between about 18:1 and 24:1, preferably between about 14:1 and 18:1.

The present invention is advantageously practiced when the weight ratio of the quantity of silica $SiO_2$ to that of the alkaline oxide(s) is between about 3:1 and 4:1, preferably about 3:1 and 3.4:1.

In addition, this new additive has a moisture contest of less than or equal to about 2%, and preferably less than or equal to about 0.5%.

Further, the apparent density of a granule is less than about 5 g/cm$^3$ and generally between about 2 and 3 g/cm$^3$. These densities are relatively low with respect to lead oxides, indicating high porosity.

This porosity is highly favorable, since it enables production of homogeneous glass or ceramic baths in which no abnormal segregating effects occur. Another consequence of this porosity is that air is trapped in the granules and released in the bath upon their decomposition. This air causes a certain brewing or bubbling effect in the bath and maintains lead oxide particles throughout the entirety of the bath. In other words, the particles do not collect at the bottom.

It is also clear that the present novel lead additive may also comprise a certain quantity of complementary additives which are well known and currently used in the glass and ceramics industries. Exemplary additives include arsenious oxide $As_2O_3$, antimony oxide $Sb_2O_3$, alkaline nitrates and carbonates, alkaline hydroxides, sand and organic products such as oil, paraffin and kerosene.

To determine the characteristics of the products of the present invention, several tests were performed to determine the rate of dust formation during handling and the abrasion resistance of the granules. These tests, although not standardized, enable a comparison to be made between the present lead additive and those products existing on the market and currently used in the glass and ceramics industries.

The capacity of these products to resist dust formation (not to form dust) during handling was determined by placing 50 grams of the product to be tested on a fritted glass disposed at the bottom of a vertical tube 50 mm in diameter and 1 meter long and by blowing in air at the rate of 20 liters/minute through the bottom end of the tube for a period of 5 minutes. The fine particles carried by the air current from the fluidized bed of the product being tested were recovered on a polyethylene filter (diameter of pores: 60 microns) placed at the upper end of the tube. This filter was weighed before and after the operation, and the percentage of fine particles formed during the operation was calculated. The results are given in the following table, in miligrams of fine particles per 100 grams of product used.

Abrasion resistance was determined by placing a mass of 150 grams of product in a 250 ml cylindrical container and placing the whole into a Turbula T2A mixer for 5 minutes at a speed of rotation of 80 rpm, which imparts a helicoidal movement to the product and the cylindrical container. Following this operation, the product was sifted at 80 microns. The results are given in the following table in milligrams of fine particles smaller than 80 microns per 100 grams of product tested.

The results of these comparative tests, performed using the products of the present invention as well as other products, are summarized in the following table.

| Products tested | Dust test, mg of particles per 100 g. of product tested | Abrasion test on Turbula |
|---|---|---|
| Minium powder w/o binder | 292 | not tested |
| Minium (coated w/ 0.2% mineral oil) | 48 | not tested |
| Powdery litharge | 78 | not tested |
| Litharge granulated in water | 160 | 500 |
| Litharge granulated in water | 273 | not tested |
| Litharge granulated by atomization | 1000 | 400 |
| Pure thermic lead silicate | 20 | 100 |
| Impure thermic lead silicate | 80–200 | 70–220 |
| Minium granulated according to the invention[1] | ≦10 | 50 |
| Litharge granulated according to the invention[1] | ≦10 | 20–80 |
| Primary oxide granulated | | |

| Products tested | Dust test, mg of particles per 100 g. of product tested | Abrasion test on Turbula |
|---|---|---|
| acc'g to the invention[1] | ≦50 | 40 |

[1] Product containing 4.56% SiO₂ and 1.50% Na₂O

The capacity of granules obtained according to the present invention to resist segregation during handling of mixtures of these granules with other components of batches generally used in crystal-making is demonstrated as follows:

The products were dry mixed in a 500 cm³ glass flask which was placed on a Turbula T2A at the speed of 30 rpm for 5 minutes.

The mixtures tested were made of the following products:
130 grams of granulated or powdery minium;
300 grams of sand;
50 grams of potassium carbonate.

The homogeneity of the mixture is determined visually by examining the distribution of red coloration given by the minium, as indicated in the table below.

| Constituents of the mixture | Distribution of red color |
|---|---|
| Sand and powdery minium | heterogeneous |
| Sand and granulated minium | homogeneous |
| Sand, powdery minium and potassium carbonate | heterogeneous |
| Sand, granulated minium and potassium carbonate | homogeneous |

The granulometry of these constituents is between 80 microns and 1 millimeter.

It was observed that no segregation occurred when granulated minium conforming to the present invention was mixed with other constituents of the batch.

When a mixture of sand, granulated minium and potassium carbonate is placed in a cylinder 5 cm high and 21 cm in diameter and this container is then placed on a sifting instrument of the Tamisor type set on gradation 30, no segregation of minium granules under the effect of horizontal vibrations was observed.

When 100 grams of this same mixture was placed in a graduated cylindrical test tube fastened to a powder compressing device of the Hermann Moritz type set on 250 strokes/minute, no segregation of minium granules, the granulometry of which is between 80 and 500 microns, was observed.

Finally, crystal batch fusion tests performed using minium granules did not show any abnormal variation in composition of the crystal between the top and bottom of the fusion crucible.

The following examples are not intended to limit the present invention, but are intended to better show its practice and advantages.

EXAMPLE 1

In a mixer (malaxator), 7 kg of minium are mixed for 20 minutes with 1.6 kg of an 80% aqueous solution of sodium metasilicate (SiO₂, Na₂O, 5H₂O). Since the molecular ratio, $R_m$ (SiO₂/Na₂O), is equal to one, it is preferable to heat the mixture to a temperature of 65° C. during mixing step (a).

The paste obtained is emptied in the form of logs one centimeter in diameter.

These logs then undergo heat treatment, i.e., drying at 120° C. for a half hour followed by a 350° C. fritting for a half hour.

The product issuing from this heat treatment step (b) is ground in a jaw grinder so as to obtain granules of 80 microns to 2 millimeters in granulometry.

EXAMPLE 2

1,000 grams of litharge are mixed with 80 grams of atomized powder of sodium silicate comprising 61.2% silica, 18.3% sodium oxide and 19.5% water. 120 grams of water are then added so that the mixture forms a malleable paste.

This paste is dried for 15 minutes as 120° C., then fritted for 45 minutes at 550° C.

The product thus obtained is ground and sifted so as to obtain granules of between 80 microns and 1 millimeter in granulometry.

The granules contain 4.53% silica and 1.35% sodium oxide.

EXAMPLE 3

15 kg of minium are mixed with 1.96 liters of an aqueous solution of sodium silicate having a density of 1.4. 0.3 liter of water is further added to obtain a more fluid paste. This mixture is mixed in a mechanical kneading trough for approximately 15 minutes.

The paste obtained is emptied into an extruder so as to condition it in the form of noodles, which are disposed in 5 kg fractions on trays. These are introduced into a conveyor furnace, the speed of which is 3.25 meters/hour.

The temperature of the furnace in the fritting zone is 400° C. and the residence time in this zone is 35 minutes.

Following this heat treatment, the products obtained are ground in a jaw crusher, then in a disk grinder, so as to obtain granules having a granulometry of between 80 microns and 1 millimeter.

After sifting, one obtains granules having an apparent uncompressed density of 2.9 g/cm³ and an apparent compressed density of 3.3 g/cm³.

These granules contain 4.73% silica and 1.61% sodium oxide.

EXAMPLE 4

Granulation of Minium

Into a 200 liter Moritz shperical mixer, driven by a 25 cv motor and equipped with a lump remover, are placed 100 kg of minium and 9 liters of a solution of silicate of soda RP 20N32, which contains 12.6 kg of silicate. The mixing is carried out at 250 rpm for 8 minutes.

The product obtained, after being dried at 150° C. for 20 minutes, has the following granulometry:

| Size of granules | % by weight |
|---|---|
| 1 mm | 30.5 |
| 500 microns-1 mm | 13.5 |
| 80-500 microns | 54.4 |
| 80 microns | 1.6 |

In order for such a product to be appropriately used, it must be ground to reduce its granulometry to between 80 to 500 microns.

After grinding, the SiO₂ content in the product is raised to 4.5% by addition of an appropriate quantity of sodium silicate, here about 3.20 kg, in the same conditions as above. Following heat treatment, granules conforming to the present invention are recovered. It was noted that although the product obtained after grinding was conducive to the formation of dusts, the granules did not produce any during handling.

These granules were tested industrially in a crystalworks. It was observed that they brought about a clear improvement of working conditions, since no trace of lead was detected in the fusion furnace control booth. When powdery minium is used in the same conditions as above, the lead rate in that atmosphere is 0.3 mg/Nm$^3$ of air, the analysis being carried out by atomic absorbtion.

EXAMPLE 5

The same observations as in the preceding example are made using a 130D/AD Lodige mixer with a capacity of 130 liters, a turbine rotation speed of 1,400 rpm and a blade rotation speed of 160 rpm.

Approximately 60% of the granules obtained have a granulometry of between 80 and 500 microns.

In this case, grinding is necessary. Following a further addition of sodium silicate under the same conditions as those of the preceding example, granules which no longer produce dust are obtained.

EXAMPLE 6

950 kg of minium are mixed with 63 kg of sodium silicate RP 20N32 diluted to 9.1%, i.e., 55% of the total quantity of silicate necessary. Mixing and granulation operations are carried out in a cylindrical apparatus having a vertical axis, equipped with a shaft equipped with knives and turning at 2,700 rpm (e.g., equipment of the Flexomix type from the Schugi company). The product obtained is partially dried and mixed with 52 kg of RP 20N32 silicate diluted 9.1%, at ambient temperature in the same equipment as previously described, and then dried at 120° C. for 15 minutes The yield of the operation is greater than 90%, and the granules obtained have a size of between 80 microns and 0.5 millimeter. The granules have very good abrasion resistance and do not produce dust when handled. The rate of dust obtained according to the test described above is less than or equal to 0.01%.

EXAMPLE 7

Granulation of Primary Oxide 950 kg of red primary lead oxide and 75 kg of sodium silicate diluted to 9.1%, i.e., approximately 45.4% of the total quantity of silicate are mixed in the apparatus of Example 6. The product obtained is dried at 60° C. for 15 minutes. The dried product is mixed with 90 kg of sodium silicate, i.e., 54.6% of the total quantity of silicate, and then dried at 120° C. for 35 minutes.

The temperature of the furnace in the fritting zone is 400° C. and the residence time in that zone is 35 minutes.

Following this heat treatment, the product is sifted at 500 microns and at 80 microns. The fraction lower than 80 microns and that higher than 500 microns after grinding, i.e., approximately 10% of the product obtained after heat treatment, is recycled upon the second addition of sodium silicate.

Granules having an apparent noncompressed density of 2.9 g/cm$^3$ and apparent compressed density of 3.3 g/cm$^3$ are thus obtained.

These granules contained 4.73% silica and 1.61% sodium oxide.

EXAMPLE 8

Granulation of Litharge 950 kg of litharge are mixed with 75 kg of soluble sodium silicate diluted to 9.1%, i.e., 45.4% of the total quantity of silicate. The paste obtained is dried at 60° C. for 5 minutes. The dried product is mixed with 90 kg of sodium silicate diluted to 9.1%, i.e., 54.6% of the total quantity of silicate needed, and then dried at 120° C. for 10 minutes. The yield is approximately 88% granules having a granulometry of between 80 and 500 microns. This yield may be increased to 100% by recycling the 12% of products not falling between 80 and 500 microns upon the second addition of sodium silicate, as described in Example 7. In the dust test, these granules produce less than 0.01% dust.

When the granules obtained according to one of the preceding examples are introduced into baths of glass, particularly crystal, no segregation phenomenon is observed.

In addition, it is noted that in contrast to classic granulation processes, one does not obtain spherical granules, but irregularly shaped granules which as a result, have lesser tendency to segregate during mixing, transportation and introduction into a furnace.

The production of lead granules with binders other than those already described is clearly within the scope of the present invention. Use of these new lead additives is not limited to the glass and ceramics industries. They may be advantageously employed in the production of enamels and accumulators, such as tubular batteries, as well as for the production of frits. This listing of applications is not intended as a limitation on the present invention.

What is claimed is:

1. A process for producing a lead additive which contains a lead oxide and an alkaline silicate having a weight ratio of lead, calculated as PbO, to alkaline silicate, calculated as SiO$_2$, between about 18:1-32:1, a moisture content of less than or equal to about 2%, and a density of less than about 5 g/cm$^3$, the process comprising the steps of:
   (a) mixing the lead oxide with all or a portion of a predetermined amount of a water-soluble alkaline silicate to obtain a mixture comprising a malleable paste;
   (b) conditioning the mixture obtained in step (a) to produce granules having a predetermined size;
   (c) subjecting the mixture obtained in step (a) to a heat treatment of drying or drying and fritting, comprising a first phase conducted at a temperature of between about 50° and 200° C. for a period from several minutes to about one hour and a second phase conducted at a substantially higher temperature than the first phase of between about 80° and 700° C. for a period of from several minutes to about one hour; and
   (d) adding any remaining portion of the water-soluble alkaline silicate to the mixture obtained in step (a).

2. The process of claim 1, wherein the mixture obtained in step (a) is subjected to a heat treatment before conditioning step (b).

3. The process of claim 1, wherein the temperature of the second phase is between about 300° and 450° C., and the lead oxide is minium.

4. The process of claim 1, wherein the temperature of the second phase is between about 400° and 700° C., and the lead oxide is litharge.

5. The process of claim 1, wherein the two phases of step (c) are performed in the same enclosure.

6. The process of claim 1, wherein the steps (b) and (c) are conducted simultaneously.

7. The process of claim 1, wherein during step (a) the lead oxide is mixed with at most two thirds, of the total quantity of alkaline silicate, with the remaining quantity being added between the first and second phases of step (c), said first phase being conducted at a temperature of between about 50° and 70° C., and said second phase being conducted at a temperature of between 80° and 150° C.

8. The process of claim 7, wherein less than half of the total quantity of alkaline silicate is mixed with the lead oxide during step (a).

9. Process according to claim 8, wherein the temperature of the second phase is between about 100° and 130° C.

* * * * *